US008020107B2

(12) United States Patent
Brewer et al.

(10) Patent No.: US 8,020,107 B2
(45) Date of Patent: *Sep. 13, 2011

(54) WEB INTERFACE FOR PROVIDING SYSTEM-STATUS ON-DEMAND

(75) Inventors: Vickie Lynn Brewer, Boulder, CO (US); Sue Ann Erstad, Tucson, AZ (US); James Arthur Fisher, Tucson, AZ (US); Raymond Anthony James, Tucson, AZ (US); William Henry Travis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 786 days.

This patent is subject to a terminal disclaimer.

(21) Appl. No.: 11/956,402

(22) Filed: Dec. 14, 2007

(65) Prior Publication Data

US 2009/0158165 A1    Jun. 18, 2009

Related U.S. Application Data

(62) Division of application No. 09/852,959, filed on May 10, 2001, now Pat. No. 7,409,638.

(51) Int. Cl.
  *G06F 3/00* (2006.01)
  *G06F 17/21* (2006.01)
(52) U.S. Cl. ............... 715/760; 715/733; 715/234
(58) Field of Classification Search .......... 715/733, 715/738, 760, 234
See application file for complete search history.

(56) References Cited

U.S. PATENT DOCUMENTS

| 5,619,656 | A | * | 4/1997 | Graf | 709/224 |
|---|---|---|---|---|---|
| 5,758,077 | A | * | 5/1998 | Danahy et al. | 709/201 |
| 5,821,927 | A | * | 10/1998 | Gong | 715/822 |
| 5,961,604 | A | * | 10/1999 | Anderson et al. | 709/229 |
| 6,038,598 | A | * | 3/2000 | Danneels | 709/219 |
| 6,092,078 | A | * | 7/2000 | Adolfsson | 1/1 |
| 6,119,079 | A | * | 9/2000 | Wang et al. | 704/8 |
| 2002/0075297 | A1 | * | 6/2002 | Boulter | 345/736 |

OTHER PUBLICATIONS

Paul McFedries, "Windows 98 Unleashed", Chapter 33 Exploring teh Web with Internet Explorer, May 12, 1998, Sams Publishing, 46 pages.*

* cited by examiner

*Primary Examiner* — Xiomara L Bautista
(74) *Attorney, Agent, or Firm* — Dillon & Yudell LLP

(57) ABSTRACT

An Internet web application interfaces to a machine to give users information about the status of the machine. The information on the status of the machine is constantly changing. This design only dynamically builds a web page when the page is requested for viewing. Once built, the page is retained so that the next time it is requested, if the information it contains has not changed, the page can be served without having to be rebuilt. If the information has changed, the design will not update the page until the page has been requested. In addition, the page is only built in the human language requested.

1 Claim, 3 Drawing Sheets

WEB INTERFACE FOR PROVIDING SYSTEM-STATUS ON-DEMAND

The present application is a divisional of U.S. patent application Ser. No. 09/852,959, filed on May 10, 2001, now U.S. Pat. No. 7,409,638, the contents of which are incorporated herein by reference.

BACKGROUND OF THE INVENTION

1. Technical Field of the Invention

This invention relates in general to a method and system for building web pages, and in particular to a method and system for improving the performance of web applications by building only requested web pages, and building the requested web pages only in the human language in which they were requested.

2. Description of the Related Art

In the prior art, Internet web applications that interface with computer systems give information to users about the status of those systems. Since the information on the status of the systems is constantly changing, a typical web application design dynamically builds web pages every time the information changes, regardless of actual current usage. Conventional designs not only constantly build the web pages, but they also build the web pages in every human language that the systems are enabled to support. This latter step of multi-language web page construction also takes place regardless of actual current usage or requests.

For example, an English language-based web application may be accessed primarily by English language-speaking users. However, when new information is available for the web page, the system will automatically update every affected web page and then build all of the web pages in every other supported human language (e.g., eight other human languages such as German, Spanish, Italian, etc.) even though the new information has not been requested by any user, and certainly not in any language other than English. Such systems inefficiently consume valuable machine time by doing much more processing than is necessary, thereby reducing performance for users and the customer satisfaction of the users. Thus, an improved system for reducing the amount of computer time and/or processing work required to support web interfaces would be desirable.

SUMMARY OF THE INVENTION

One embodiment of a method and system according to the present invention is an Internet web application that interfaces to a machine to give the user information about the status of the machine. The information on the status of the machine is constantly changing. This design dynamically builds a web page only when the page is requested for viewing. Once built, the page is retained so that the next time it is requested, if the information it contains has not changed, the page can be served without having to be rebuilt. If the information has changed, the design will not update the page until the page has been requested. In addition, the page is only built in the human language requested. For example, if a machine is located in France, the main language used is French, even though eight other languages are offered. In this example, the web page is only built in French. If some other language is requested, that language also is built, but machine resources are not wasted building pages that are not requested.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

The present invention may be executed in a variety of systems including computer systems having various operating systems. The computer system may be a personal computer, a network computer, a midrange computer or a mainframe computer. In addition, the computer may be a stand-alone system or part of a network such as a local-area network (LAN) or a wide-area network (WAN). For the purposes of illustration, one embodiment of the present invention, as described below, is implemented utilizing a personal computer.

Figure 1:
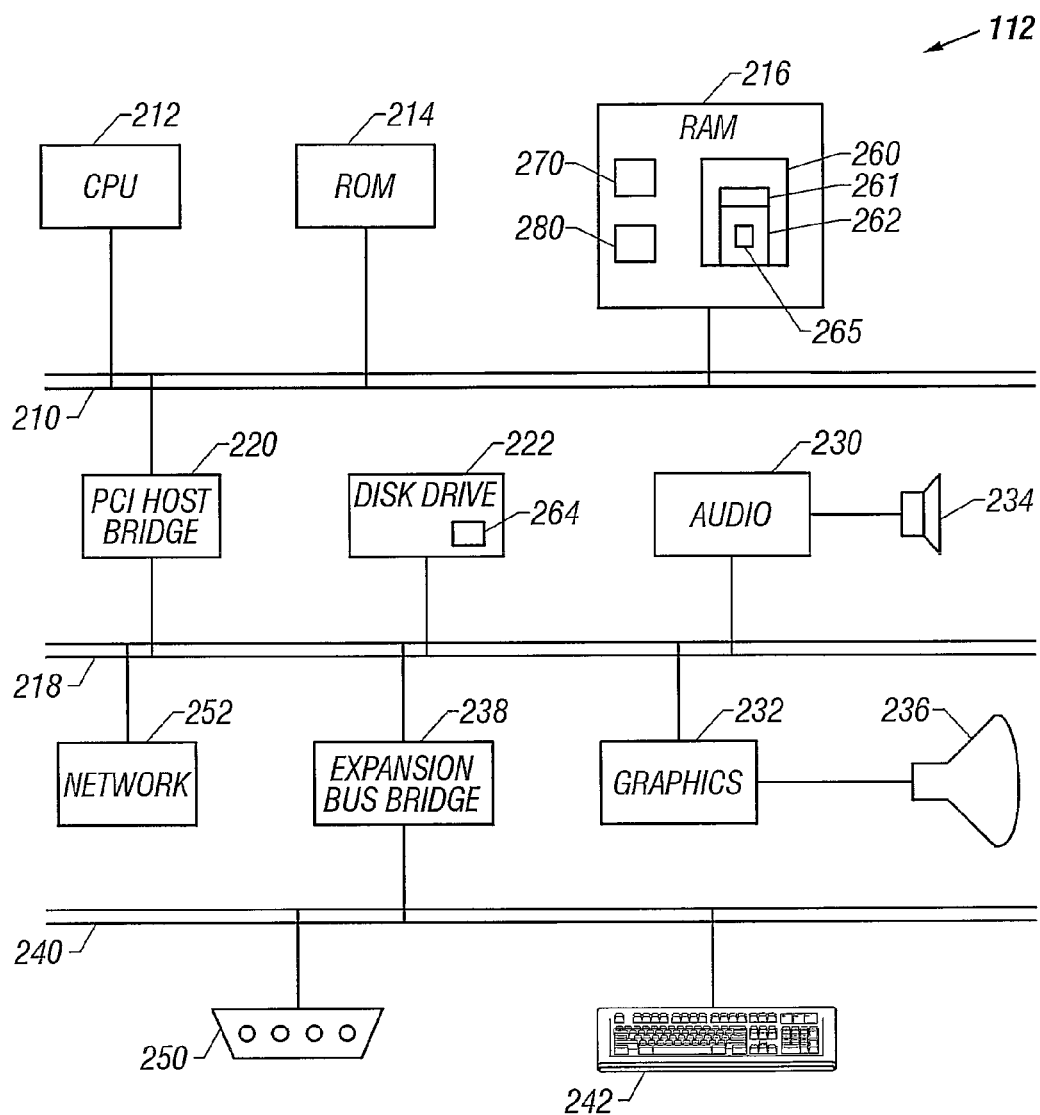
FIG. 1 depicts a schematic diagram of an illustrative embodiment of a system constructed in accordance with the present invention.

Referring now to FIG. 1, there is depicted a block diagram of a personal computer (PC) 112. PC 112 includes a system bus 210 that is connected to a central processing unit (CPU) 212 and to memory, including read only memory (ROM) 214 and random access memory (RAM) 216. System bus 210 is coupled to a PCI local bus 218 through a PCI host bridge 220. PCI local bus 218 is connected to additional nonvolatile data storage devices, such as one or more disk drives 222, and to an audio adapter 230 and a graphics adapter 232 for controlling audio output through a speaker 234 and visual output through a display device 236, respectively. A PCI-to-ISA bus bridge, such as expansion bus bridge 238, connects PCI local bus 218 to an ISA bus 240, which is attached (through appropriate adapters) to a keypad 242 for receiving operator input.

Also included within PC 112 are data ports for communicating with external equipment, such as other data processing systems. The data ports include, without limitation, a serial port 250 attached to ISA bus 240 for linking PC 112 to remote data processing systems (such as a bridge) via a modem (not illustrated) and a communications adapter 252 attached to PCI bus 218 for linking PC 112 to other stations of a LAN (such as clients).

PC 112 also contains software applications that are stored on the data storage devices and loaded into RAM 216 for execution by CPU 212. Among those applications is a communications program, such as communications manager 260, that manages the exchange of information between the LAN and remote data processing systems. Included in communications manager 260 is a connection initiator 261 for establishing dial-up connections to remote data processing systems. Communications manager 260 also includes Internet sharing software 262 that enables multiple LAN stations to access the Internet via a single connection. In the illustrative embodiment, PC 112 also includes a connection schedule file 264, which preferably is stored in disk drive 222, and Internet sharing software 262 includes a request predictor 265 that utilizes connection schedule file 264 to trigger connection initiator 261 in advance of anticipated communication requests.

Connection schedule file 264 is maintained by a schedule editor and/or an automatic schedule modifier, each of which is preferably also included in Internet sharing software 262. PC 112 also includes a web server 270 that allows a client to retrieve and view information from the Internet.

Figure 2:
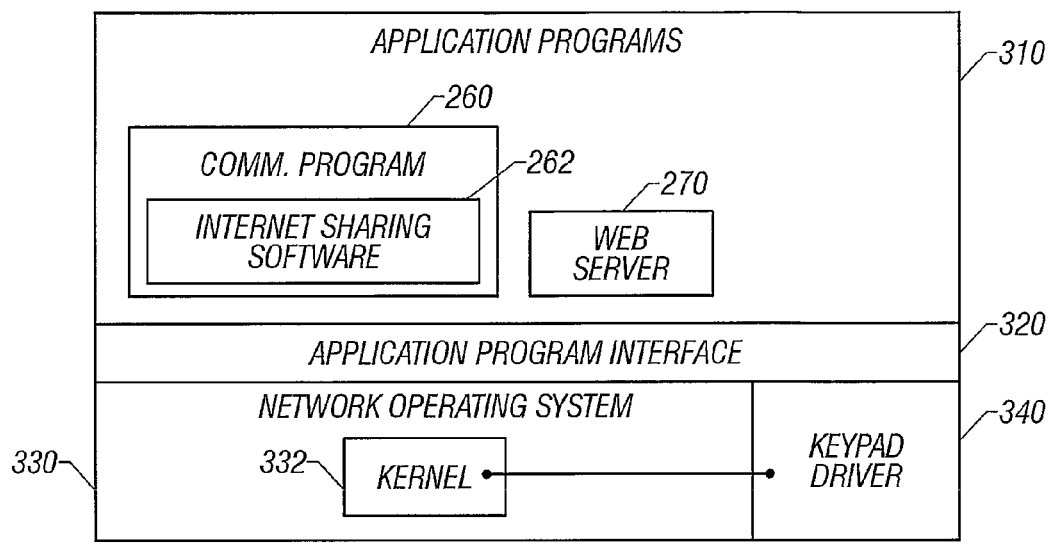
FIG. 2 is a layer diagram of the programs in the system of FIG. 1 that cooperate to automatically connect to a remote data processing system according to the present invention.
Figure 3:
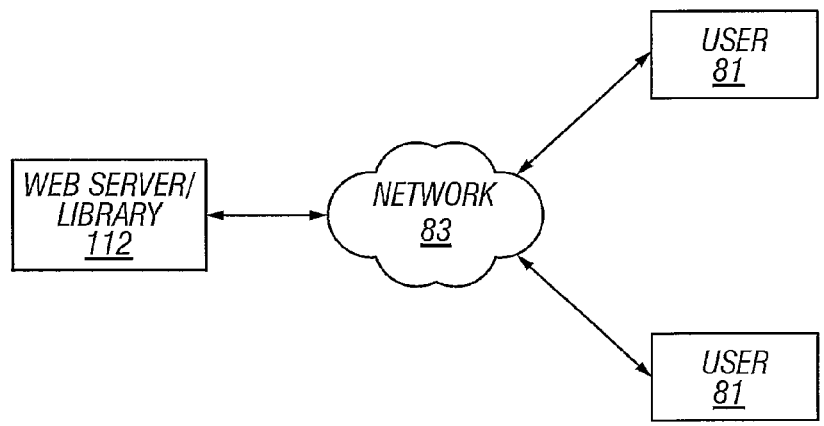
FIG. 3 is a schematic operational diagram of the system of FIG. 1.

With reference now to FIG. 2, there is depicted a layer diagram of the software applications within PC 112 that cooperate to provide the functionality of the present invention according to the illustrative embodiment. At the highest level of the layer diagram are the software application programs 310, including communications manager 260 and web server 270. At the intermediate level is an application program interface (API) 320, through which application programs 310 request services from the operating system 330. Operating system 330, which occupies the lowest level of the layer diagram, is a network operating system. As such, in addition to managing the operations of PC 112 (by performing duties such as resource allocation, task management, and error detection), operating system 330 also provides tools for managing communications within the LAN and between LAN stations and remote data processing systems. Included within operating system 330 is a kernel 332 that manages the memory, files, and peripheral devices of PC 112. The lowest level also includes device drivers, such as a keypad driver 340 that kernel 332 utilizes to manage input from and output to peripheral devices. FIG. 3 schematically illustrates the present invention as a system utilizing PC 112 and web server 270 for communicating with users 81 through a network 83.

Figure 4:
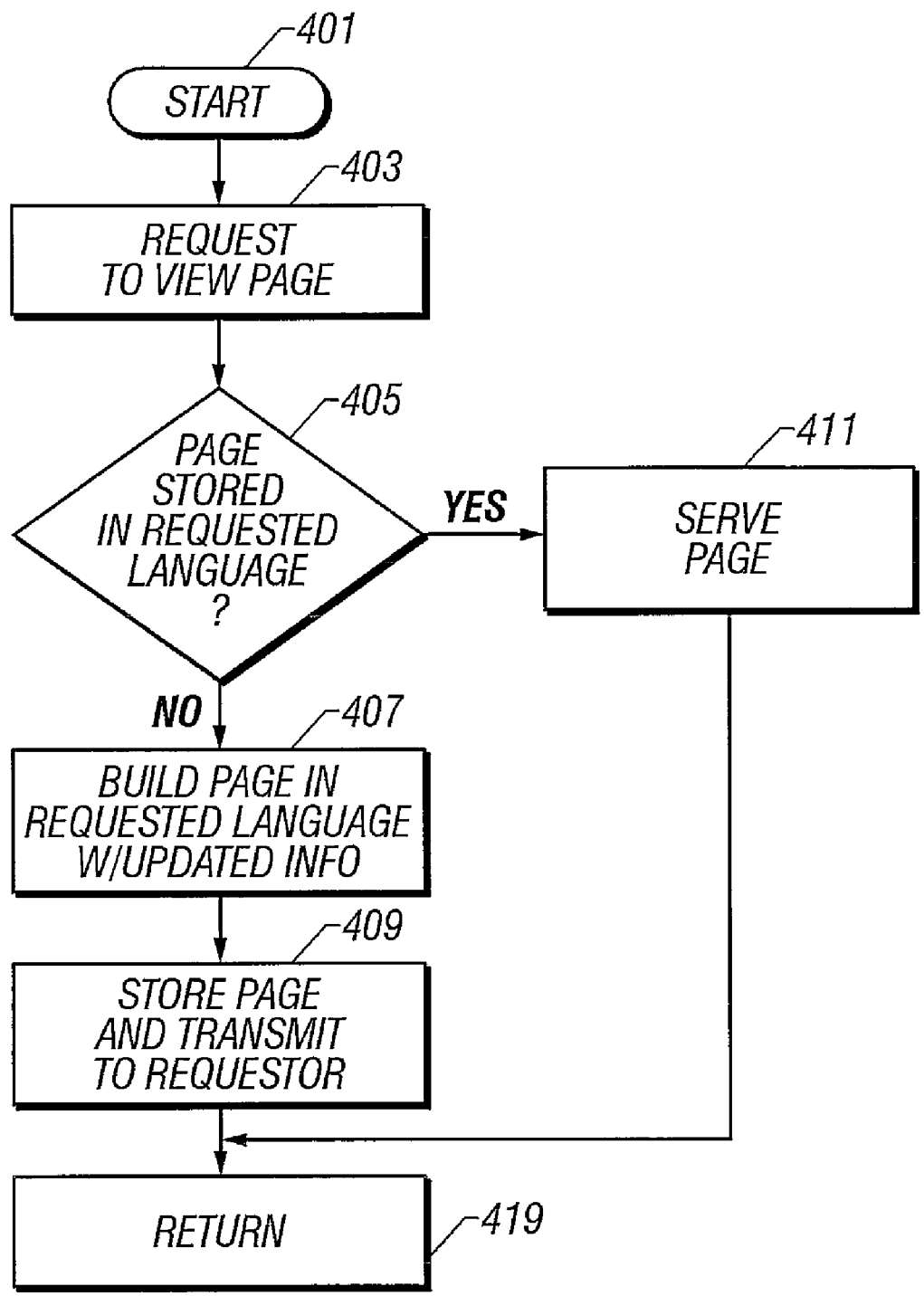
FIG. 4 is a high level, logical flowchart of an illustrative embodiment of the method and system of the present invention.

Referring now to FIG. 4, there is illustrated one embodiment of a high level, logic flow diagram of a system and method for reducing the amount of computer time and/or processing work required to support web interfaces. In the version shown, the algorithm begins as illustrated at block 401. When a request to view an HTML or web page is generated by a user, as shown in block 403, the system determines whether the page exists statically (has already been built and stored) in the human language that it was requested in, as depicted at block 405. If the page exists then the web page is served up as depicted by block 411. If not, the web page is dynamically built in the requested language with any updated data, as illustrated at block 407, and then stored (cached locally and/or saved), and transmitted to the requester, as depicted at block 409. If the requested page is stored, the page is served to the user and the system then ends or returns, as illustrated at block 419.

The web page is only built in the human language requested by the user. For example, if the user made a request in the English language, the web page would only be built (including the new information) in the English language. The web page would not be built in any other human language until a specific request for such a language is received. The system is capable of building the page in all supported languages. Finally, after the page is built with the new information only after a user requests to view it, and only in the language that was requested, the page is locally cached and/or saved on hard disk for later use, and transmitted to the requesting user. The system then awaits additional requests from users and for additional new data or information for the web page.

The present invention may be implemented in a variety of systems or applications. For example, IBM Corporation's Magstar® 3494 Tape Library Specialist is a web interface to the Magstar® 3494 Automated Tape Library. Since the software that controls the management of the library runs on a PC and there are critical items needed to control the library, taking MIPS or processor cycles to build web pages is a significant concern. Anything developers can do to reduce the amount of time required or the amount of work required to support the web interface would be desirable.

In this implementation of the present invention, the web interface provides users with information about the status of the library. The status of the library is constantly changing as the library runs. The interface cannot cause any disruption to the operation of the library that it is monitoring, but must provide current information on status. To solve this problem the interface of the present invention was developed between the web server and the library. When a piece of information changes on the library that the web interface is interested in (i.e., new data or information), the library writes a variable file to the hard drive which contains all the dynamic information needed to update a particular web page. Each time information changes on the library, a new variable file is written to the hard drive and any existing web pages containing the old information are deleted. These variable files contain labels and rules that the web server knows how to interpret. The Library writes a label with a rule following it. The rule tells the web server what type of information follows and what to do with it. Some rules tell the web server how to find a value in a DLL (Dynamic Link Library) for a translated word. Other rules tell the web server to fill in a literal string into the HTML page.

When a request is made by a user to view a particular web page, the web server uses a static HTML file (also located on the hard drive) that contains all the static information to build the requested web page and merges in the dynamic information that the library stored in the variable file the last time the information changed. The static HTML contains place holders for the dynamic information. The web server must match up the dynamic information with the static place holders located in the HTML file.

The user can select a supported language for the page to be displayed in and the web server will select the static HTML file in the requested language and merge the dynamic data in the requested language and display the page for the user in the language the user selected. Once a page is merged (static and dynamic info) it is saved. When the page is again requested, it can be served directly. When information is updated, the system searches all the language directories and deletes all existing pages that reference the updated information in all the supported languages where the page exists. This system insures that a new page is built the next time a request is made.

When the status information is changed by the library and a new variable file is written to the hard drive, the merged HTML file is deleted and a new file will be built on the next request for the page. This process allows the library to write out information when it needs to. It does not require the web server to interrupt operation of the library with inquiries when a page is requested. Pages are only built when requested and only in the language requested. Even though many languages may be supported by the application, a given machine probably only uses one or two of the supported languages depending on its location. Building all of the language pages each time status changes would waste valuable processing time.

The present invention has several advantages that include saving valuable machine time by not doing any more processing than necessary. In contrast, prior art systems dynamically build web pages in every supported human language every time the data changes regardless of whether the information had been requested by user. With the present invention, nothing happens when information changes unless someone requests to view the information. When a request is given, the page is dynamically built, but only in the human language requested. Thus, when information changes and no users are looking at it, no work is done, thereby allowing significant work savings.

Although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been shown or described in only some of its forms, it should be apparent to those skilled in the art that it is not so limited, but is susceptible to various changes without departing from the scope of the invention.

What is claimed is:

1. A data processing system for displaying machine status information, said data processing system comprising:
   a machine configured to maintain status data specifying a status of said machine; and
   a web server coupled to said machine via a web interface, wherein said web server comprises
      means for receiving a request from a user to view a web page comprising said machine status information,
      means for causing said web page to be displayed to said user in response to said request in order to reduce an amount of processing work required by said machine, wherein said means for causing comprises means for generating a new markup language file in response to a determination that said status data has been previously updated, and
   means for transmitting said new markup language file to said user said request comprises data specifying a requested human language, and said means for generating comprises means for generating said new markup language file in only said requested human language.

* * * * *